Dec. 21, 1926.  
M. F. COX  
DUST GUARD  
Filed Oct. 20, 1924

1,611,818

Inventor  
Millard F. Cox

By

Attorneys

Patented Dec. 21, 1926.

1,611,818

UNITED STATES PATENT OFFICE.

MILLARD F. COX, OF LOUISVILLE, KENTUCKY.

DUST GUARD.

Application filed October 20, 1924. Serial No. 744,824.

This invention relates to dust guards for journal boxes, employed for preventing the entrance of dust, grit or other foreign matter into the journal box.

The invention has for its object to simplify, render more efficient and durable and improve generally devices of this character, and contemplates the production of dust guards of a cheap, strong and ductile metal, such as malleable iron or electric steel, the invention further contemplating a construction wherein the guard may be cast, thus effecting a considerable saving of material.

The invention also contemplates the provision of filler elements, preferably in the form of segments carried by the guard body and engaging the axle. These filler elements are detachably mounted so that they may be readily renewed as they become worn, thus enhancing the value of the guard from an economical standpoint.

Figure 1:
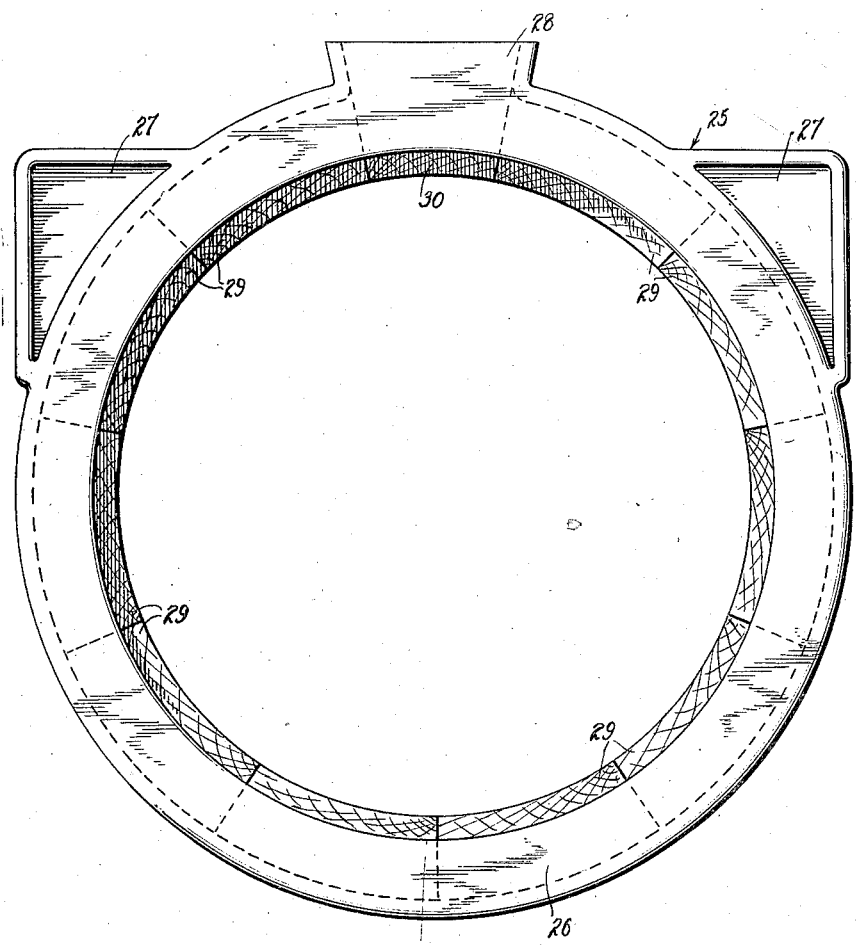
Figure 2:
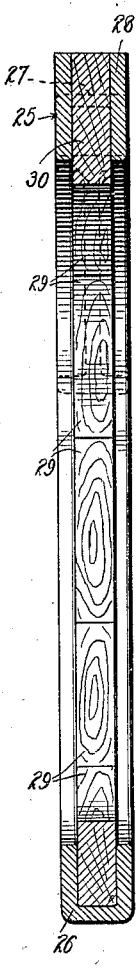

The details of construction of my improved invention will be made more apparent as this description proceeds, especially when considered in connection with the accompanying drawings, wherein, Figure 1 is an enlarged elevational view of the guard itself;

Figure 2 is a vertical sectional view of the same;

The dust guard is adapted to be inserted in a suitable slot in the journal box. It is carried by the axle and has a floating connection with the journal box so that it may move with the axle and function to prevent the entrance of foreign matter into the journal box through the opening through which the axle passes.

As shown in the drawing the body 25 of the guard is formed of metal and provided with an inner peripheral circular channel 26, the open side of the channel being toward the center of the circle. The guard body is shaped to provide angular or squared portions 27, which, when the guard is positioned, prevents rotation of the same upon the axle.

A hollow tapered extension 28 communicates with the channel 26. This portion forms a recess which is keystone shaped, for a purpose to be made apparent hereinafter.

The packing elements consist of a plurality of segmental blocks 29 formed preferably of wood. These blocks are inserted into the channel 26 in sufficient numbers to nearly fill the same. Thereupon a key block 30 is inserted through the upper end of the tapered extension 28 whereupon the segmental elements 29 are forced tightly into engagement with one another and securely held in place in the flange 26. At the same time the key block wedges against the tapered sides of the extension 28 and is thereby secured in place. Thereafter the segments 29 are bored to provide a concentric opening for the axle 10.

It has been found efficient and satisfactory to form the filler or packing segments of scrap wood, such as accumulates in large quantities in all wood working shops and the like. This material can be purchased in any event for a nominal sum and in many instances may be had for the hauling. This inexpensive material reduces the cast of lining the guards to a minimum, while the metallic bodies of the guard will last indefinitely. The wooden segments are sawed into shape ond placed in position and then wedged securely in the holder by driving in place the key block at the top. The number of segments may be varied, it being obvious, however, that the larger the segments the more material is lost in shaping the same, while with smaller segments there is a less loss of material but the labor is slightly increased.

From the foregoing it will be immediately apparent that there is provided a guard essentially of a metallic construction, provided however with the renewable filler or packing elements adapted to engage the axle whereby the guard may be caused to intimately engage the axle for preventing the entrance of dirt or other foreign matter. The body of a guard contracted of metal is practically indestructible and by renewing the packing at frequent intervals the guards may be made to serve efficiently for an indefinite period.

The construction of the guard facilitates the introduction of this packing medium, which may be readily renewed when the same becomes worn. It has been found that the construction of the guard is such that little or no wear is occasioned thereto and that by periodic renewal of the packing the guard is maintained at its maximum efficiency.

Having thus described my invention, what I claim is:

A dust guard for journal boxes comprising a circular channel member, the open side of the channel being toward the center of the circle, said member having a tapered hollow extension opening into the channel, a series of segmental shaped filler elements arranged in a nearly complete ring in said channel, and a wedge member wedged into said hollow extension and between the ends of said nearly complete ring to hold the filler elements in place.

The foregoing specification signed at Louisville, Jefferson County, Kentucky, this 2nd day of October, 1924.

MILLARD F. COX.